Nov. 18, 1952 — C. A. LUNDEEN — 2,618,468
POWER TONG
Filed Dec. 30, 1947 — 7 Sheets-Sheet 1
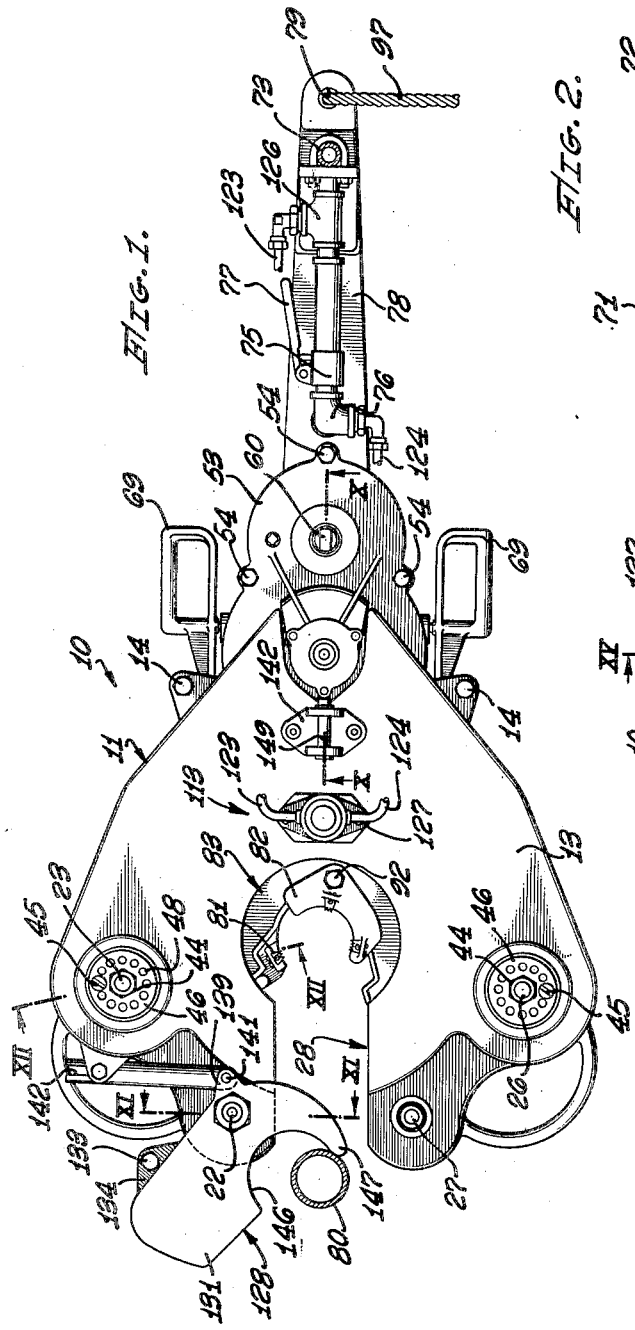
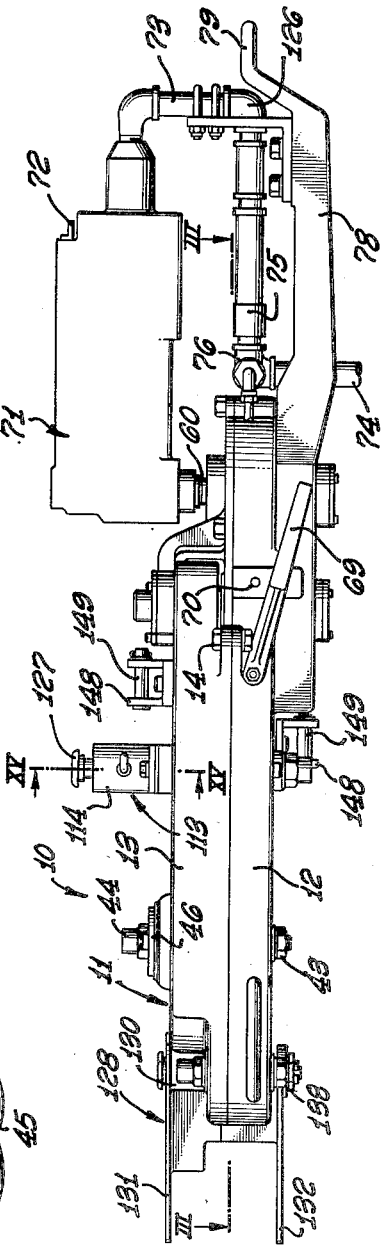
INVENTOR.
CHESTER A. LUNDEEN,
BY Lyon & Lyon
ATTORNEYS.

Nov. 18, 1952  C. A. LUNDEEN  2,618,468
POWER TONG
Filed Dec. 30, 1947  7 Sheets-Sheet 2
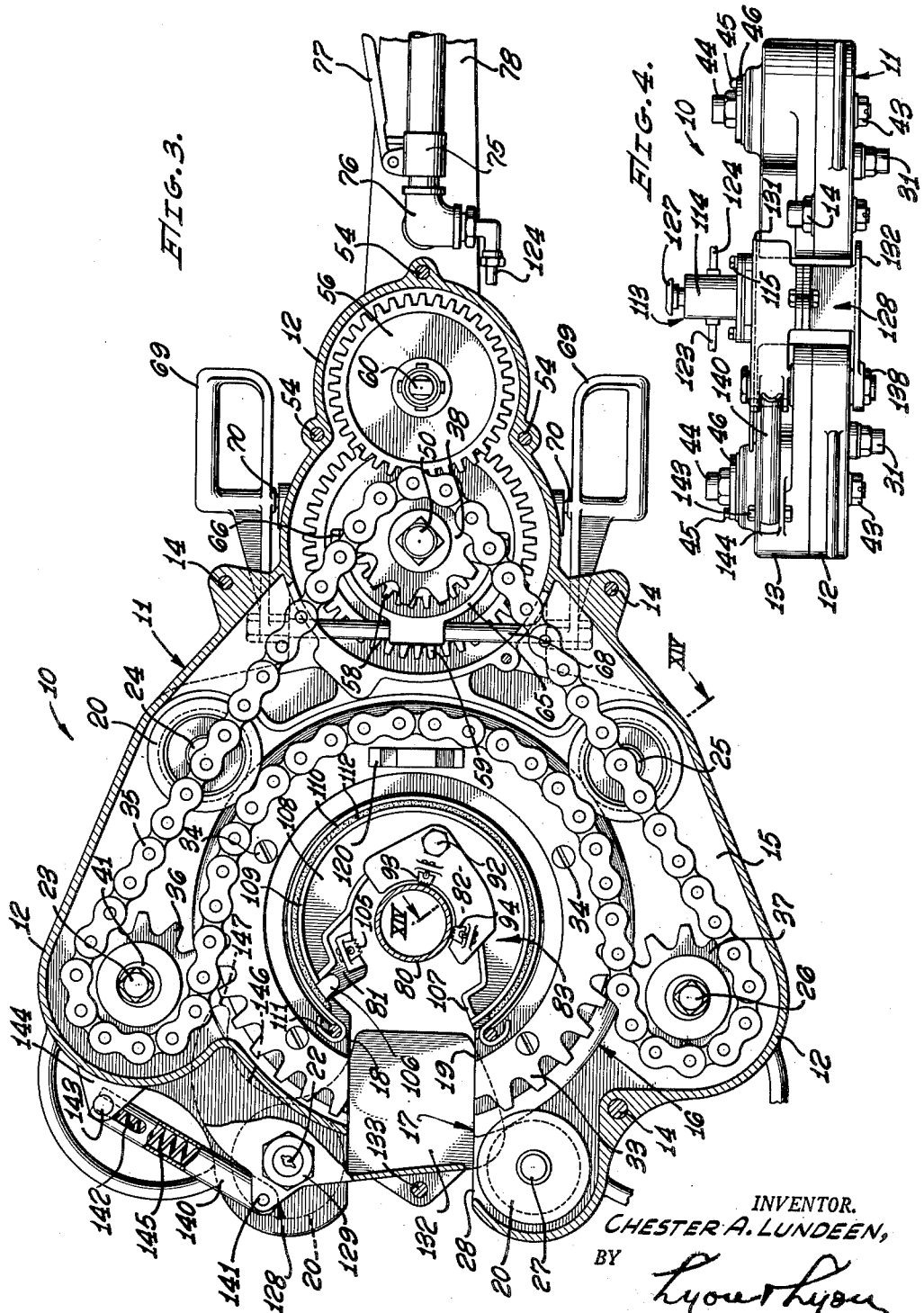
INVENTOR.
CHESTER A. LUNDEEN,
BY
ATTORNEYS.

Nov. 18, 1952  C. A. LUNDEEN  2,618,468
POWER TONG
Filed Dec. 30, 1947  7 Sheets-Sheet 3
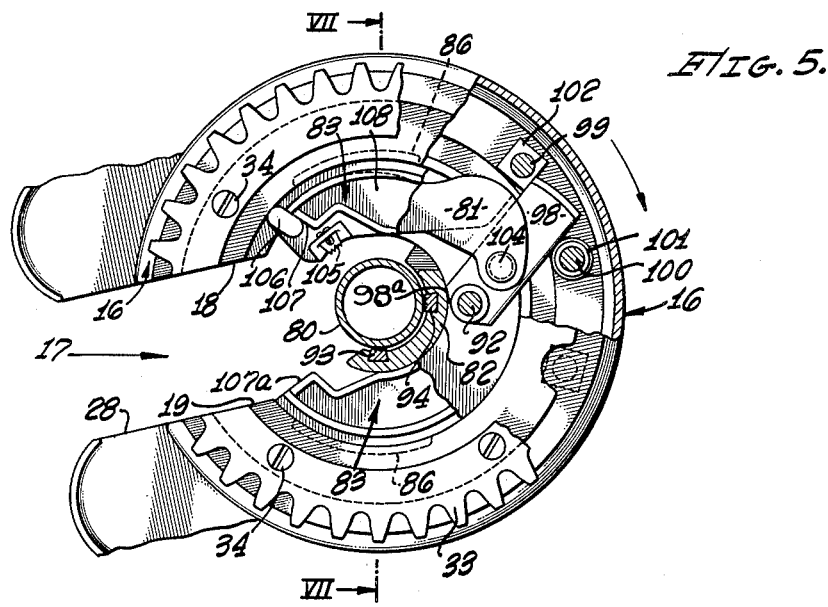
FIG. 5.
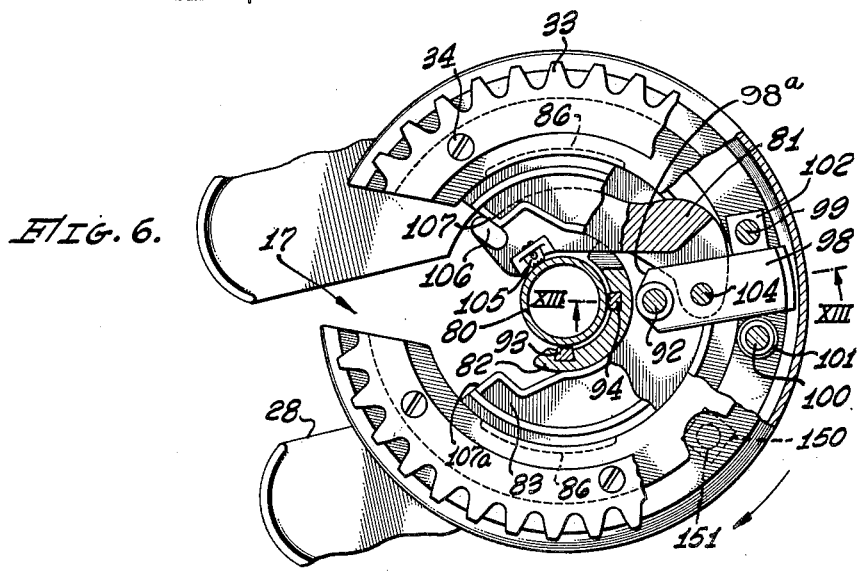
FIG. 6.
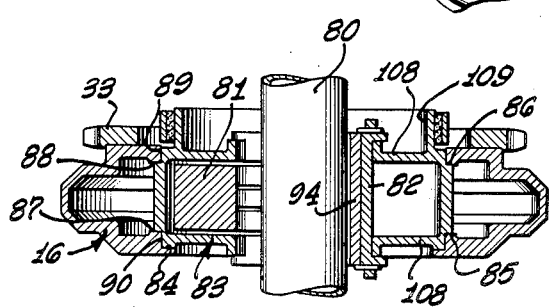
FIG. 7.
INVENTOR.
CHESTER A. LUNDEEN,
BY
Lyon & Lyon
ATTORNEYS.

Nov. 18, 1952  C. A. LUNDEEN  2,618,468
POWER TONG
Filed Dec. 30, 1947  7 Sheets-Sheet 4
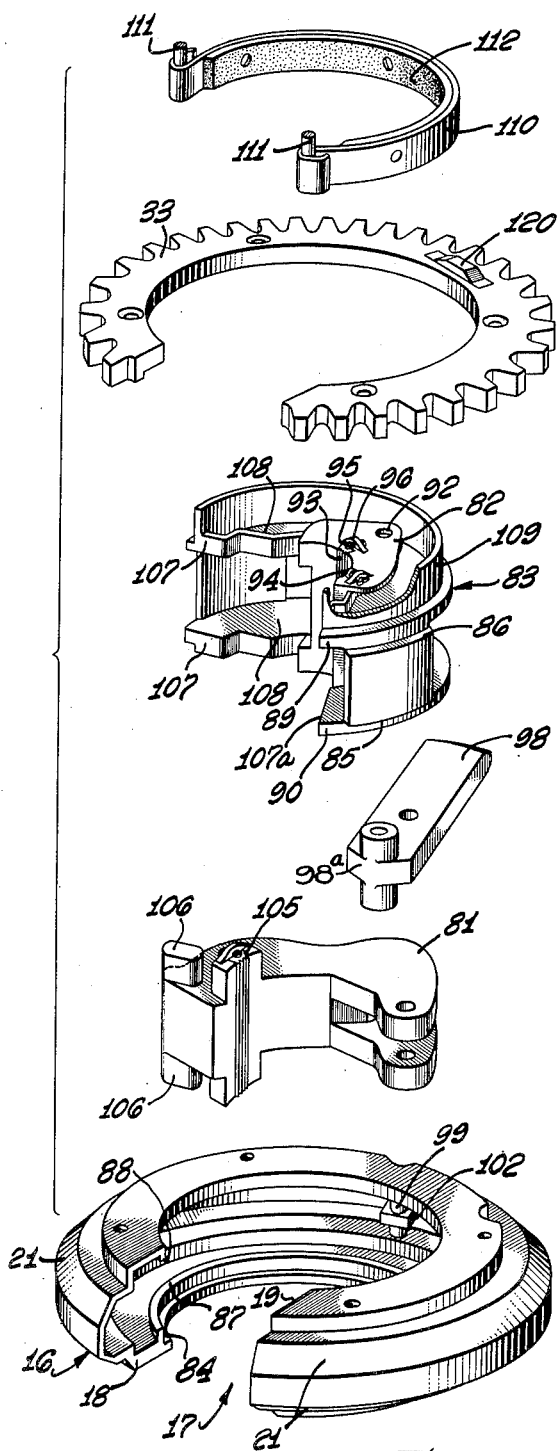
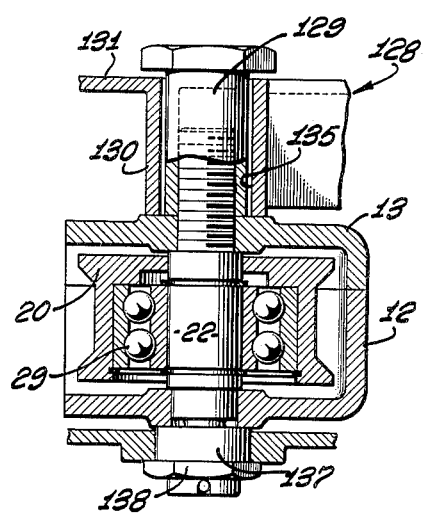
FIG. 11.
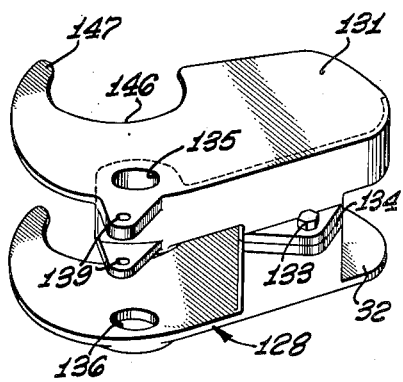
FIG. 9.
FIG. 8.
INVENTOR.
CHESTER A. LUNDEEN,
BY
ATTORNEYS.

Nov. 18, 1952 — C. A. LUNDEEN — 2,618,468
POWER TONG
Filed Dec. 30, 1947 — 7 Sheets-Sheet 5
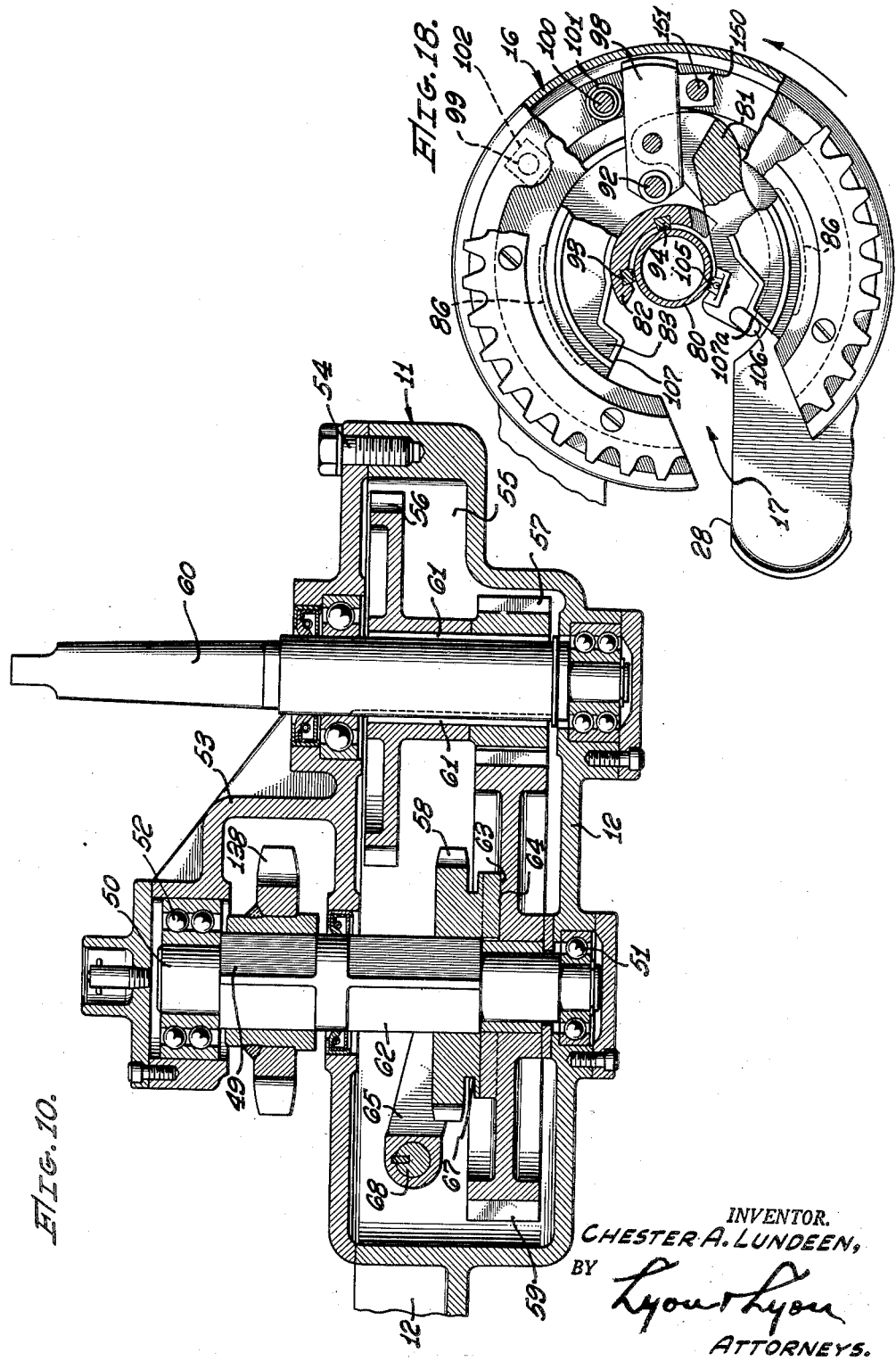
INVENTOR.
CHESTER A. LUNDEEN,
BY Lyon+Lyon
ATTORNEYS.

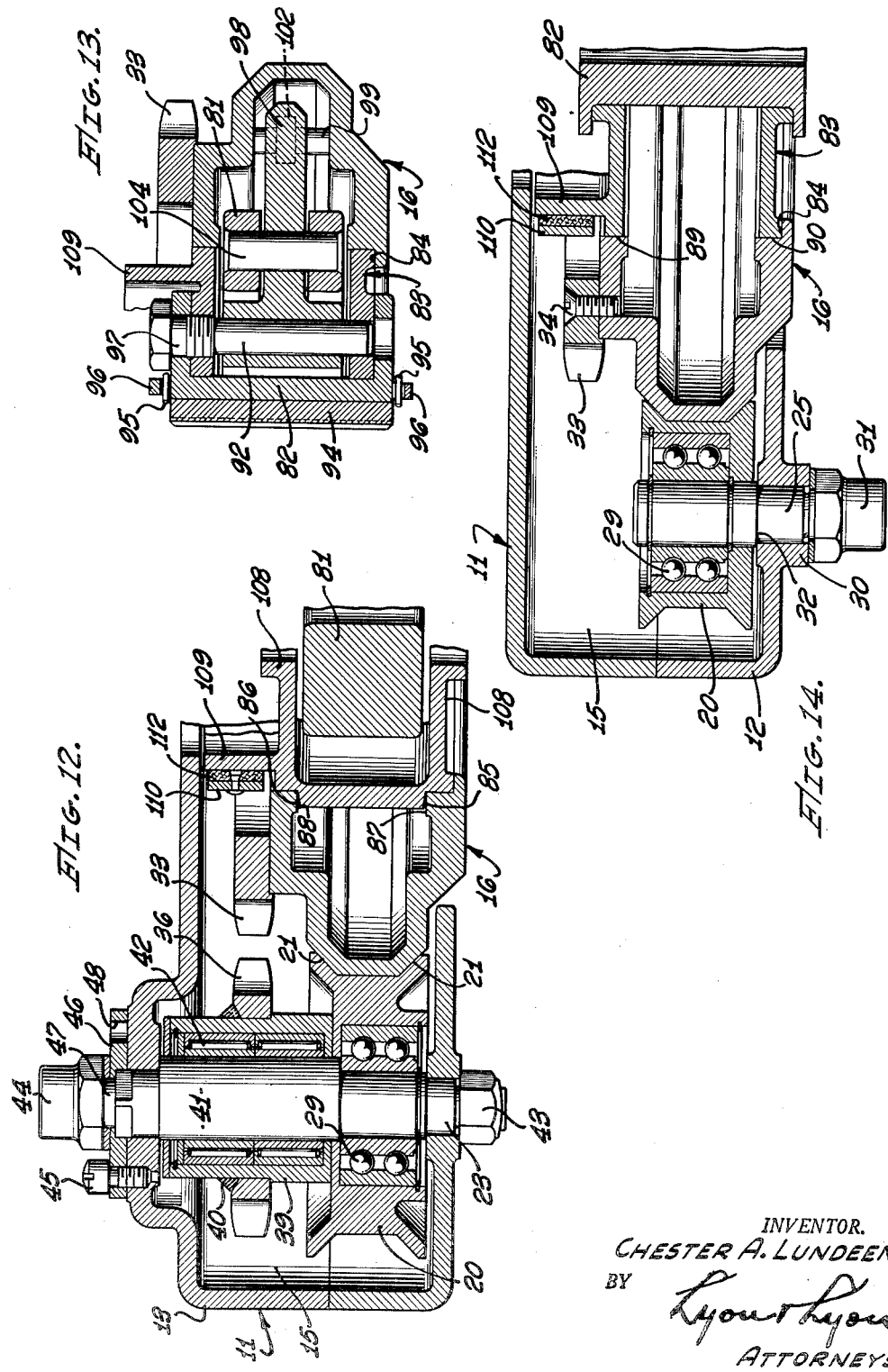

Nov. 18, 1952     C. A. LUNDEEN     2,618,468
POWER TONG
Filed Dec. 30, 1947     7 Sheets-Sheet 7
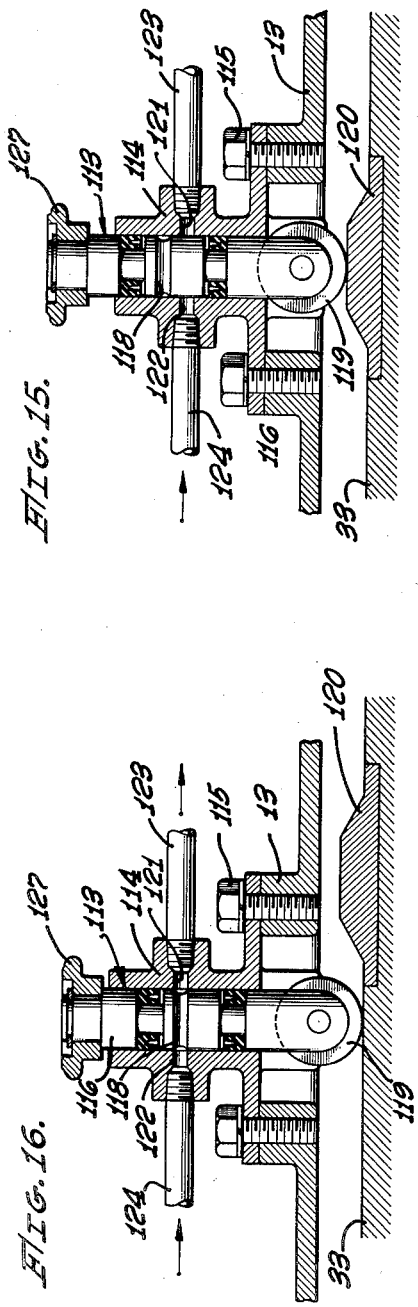
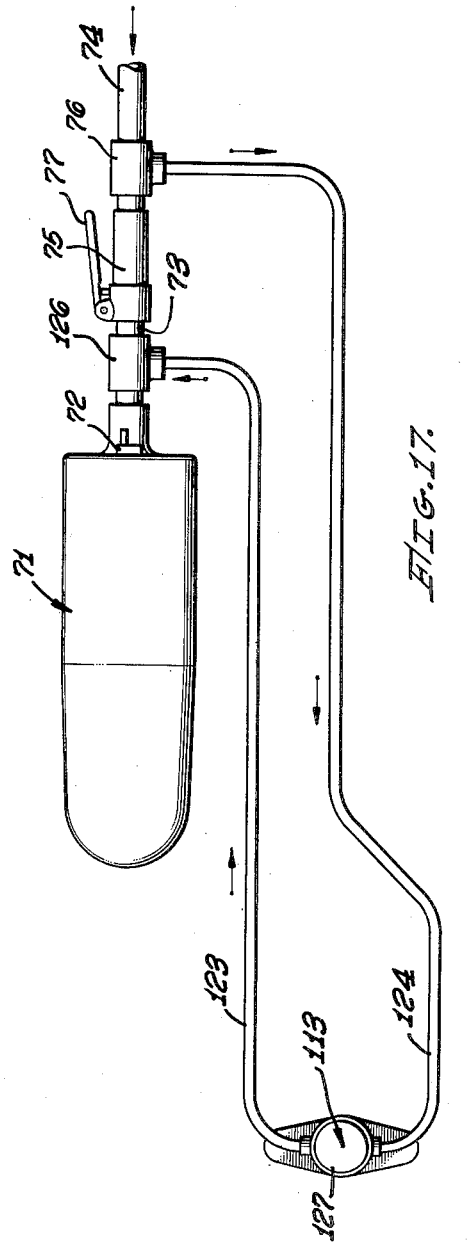
INVENTOR.
CHESTER A. LUNDEEN,
BY
ATTORNEYS.

Patented Nov. 18, 1952

2,618,468

UNITED STATES PATENT OFFICE 2,618,468

POWER TONG

Chester A. Lundeen, Los Angeles, Calif., assignor to Byron Jackson Co., Vernon, Calif., a corporation of Delaware Application December 30, 1947, Serial No. 794,745

18 Claims. (Cl. 255—35)

1

This invention relates to power driven tongs of the type used for screwing or unscrewing threaded sections of pipe. This invention is particularly useful in connection with joining or unjoining sections of tubing, drill pipe, or casing as employed in drilling a well or producing fluid therefrom.

The principal object of this invention is to provide a novel form of power driven pipe tong.

Another object is to provide a tong device having an integral ring rotatably mounted and provided with a radial pipe opening, and having a novel form of pipe gripping device carried by the ring.

Another object is to provide such a tong device in which a jaw carrier is mounted on a power driven ring, and gripping jaws on the carrier are arranged to grip the pipe upon relative co-axial rotary movement of the carrier and ring.

Another object is to provide a power driven pipe tong having a frame provided with a pipe entrance slot, an integral power driven ring rotatable on the frame and provided with a similar slot, together with novel means for aligning said slots.

A more detailed object is to provide a new and improved form of guard adapted to provide a barrier across the entrance slot in the frame.

A further object is to provide detailed improvements in the manner of supporting and driving the rotatable ring.

Other objects and advantages will appear hereinafter.

In the drawings:

Figure 1 is a top plan view showing a preferred embodiment of my invention, the air motor being omitted.

Figure 2 is a side elevation thereof.

Figure 3 is a top plan view on an enlarged scale and partly broken away, as shown substantially on the lines III—III in Figure 2.

Figure 4 is a front elevation.

Figure 5 is a sectional detail showing the movable pipe-gripping jaw in its retracted position.

Figure 6 is a view similar to Figure 5 and showing the movable pipe-gripping jaw in its operative position.

Figure 7 is a transverse sectional elevation of the supporting ring and its associated parts taken substantially on the lines VII—VII as shown in Figure 5.

Figure 8 is a perspective exploded view showing the ring carrier and associated parts.

Figure 9 is a perspective view of the guard employed in connection with my device.

Figure 10 is a sectional elevation taken substantially on the lines X—X as shown in Figure 1.

Figure 11 is a sectional detail taken substantially on the lines XI—XI as shown in Figure 1.

Figure 12 is a sectional view taken substantially on the lines XII—XII as shown in Figure 1.

2

Figure 13 is a partial sectional elevation taken substantially on the line XIII—XIII as shown in Figure 6.

Figure 14 is a sectional view taken substantially on the line XIV—XIV as shown in Figure 3.

Figure 15 is a sectional view of the positioning valve, shown in closed position and taken substantially on the lines XV—XV as shown in Figure 2.

Figure 16 is a view similar to Figure 15 with the positioning valve shown in open position.

Figure 17 is a diagrammatical view of the piping connecting the positioning valve and air motor.

Figure 18 is a view similar to Figure 6 but illustrating the fixed and movable jaws in position to rotate the pipe in a counterclockwise direction.

Referring to the drawings, the tong device 10 is provided with a frame generally designated 11. The frame 11 includes a base 12 and a detachable cover 13 connected to the base by means of a plurality of releasable bolts 14. The base 12 and cover 13 cooperate to provide an inclosure 15. Within this inclosure is positioned an integral ring 16 having a side entrance opening 17 defined by the parallel walls 18 and 19. The ring 16 is rotatably supported on the frame 11 by means of a plurality of grooved rollers 20 which engage the surfaces 21 provided on the ring 16. A sufficiently large number of rollers 20 is provided to support the ring 16 adequately regardless of the position of the side opening 17.

Thus, as shown in Figure 3 of the drawings, six rollers 20 are mounted on the frame 11 and are carried on upwardly extending shafts 22, 23, 24, 25, 26 and 27. Shafts 22 and 27 are positioned symmetrically on opposite sides of an entrance slot 28 provided in the base 12 and cover 13. Suitable bearing means 29 are provided for supporting each of the rollers 20 on its respective shaft. Shafts 24 and 27 may be constructed and supported in the manner illustrated for shaft 25 in Figure 14. This shaft extends through a boss 30 on the base 12 and is secured by means of a threaded nut 31. A shoulder 32 on the shaft engages the upper end of the boss 30.

Means are provided for turning the ring 16, and as shown in the drawings this means includes a sprocket 33 secured to the ring 16 by means of a plurality of threaded elements 34. The sprocket 33 is provided with an entrance opening aligned with the opening 17 in the ring 16. The sprocket 33 is driven by means of a chain 35 which is trained around idler sprockets 36 and 37 and driven from the driving sprocket 38. The sprockets 36 and 37 are carried by the upper portions of the shafts 23 and 26. As shown in Figure 12 the sprocket 36 is fixed on a hub 39 by means of weld metal 40. The hub 39 is rotatably mounted on an eccentric portion 41 of the shaft 23 by means of suitable bearing assemblies 42. The purpose of the eccentric portions 41 on the shafts 23 and 26 is to provide means of adjustment of the tension in the chain 35. In order to take up slack either or both of the shafts 23 and 26 may be turned. This is accomplished by unscrewing the nuts 43 and 44 and removing the cap screw 45. A ring 46 provided with a noncircular opening receives a noncircular portion 47 on the shaft so that by turning the ring 46 the shaft may be turned to any desired angular position. The cap screw 45 is then reinserted into one of the holes 48 in the ring 46 in order to secure the shaft at the selected angular position. The nuts 43 and 44 are then retightened. Turning of the shaft 23 does not affect the position of the roller 20 which is mounted on a concentric portion of the shaft.

It will be understood that the construction and mounting of the sprocket 37 on the shaft 26 is substantially identical to the construction and mounting of the shaft 23 shown in Figure 12.

The driving sprocket 38 is mounted on a squared portion 49 of the power shaft 50 so that the sprocket 38 rotates with the shaft. The shaft 50 is rotatably mounted in axially spaced bearings 51 and 52 carried by the base 12 and auxiliary cover 53 respectively. The cover 53 is secured to the base 12 by means of a plurality of threaded elements 54. The cover 53 and base 12 cooperate to define a chamber 55, and within this chamber are mounted a pair of driving gears 56 and 57 and a pair of driven gears 58 and 59. The driving gears 56 and 57 are fixed on a driving shaft 60 by means of suitable keys 61. The driven gear 59 is rotatably mounted on the power shaft 50, while the driven gear 58 is slidably mounted on a squared portion 62 of the shaft 50 so that it will slide axially of the shaft but must rotate therewith. Interengaging clutch faces 63 and 64 are provided on the gear 58 and gear 59 respectively.

Means are provided for shifting the gear 58 into engagement with the driving gear 56 and for simultaneously separating the interengaging jaw faces 63 and 64. As shown in Figures 3 and 10 this means includes a yoke 65 having elements 66 engaging in the groove 67 and carried on a pivotally mounted yoke shaft 68. The shaft 68 extends outwardly through the base 12 and is provided with a pair of actuating levers 69 on opposite sides of the tong device. Detent means 70 may be provided for releasably latching the levers 69 in either the upper or lower position.

Means are provided for rotating the shaft 60, and as shown in the drawings this means includes an air motor generally designated 71. This air motor 71 may be of any conventional or desirable type and is preferably provided with an actuating lever 72 for reversing the direction of rotation. The motor 71 receives the upper end of the shaft 60 in driving relation. Air under pressure is supplied to the motor 71 by way of the piping 73 which also acts as a support for the outer end of the air motor 71.

A supply conduit 74 communicates with an air compressor reservoir or other suitable source of compressed air and also communicates with the air control valve 75 via fitting 76. The valve 75 is provided with a manually operable lever 77 which may be conveniently operated from either side of the tong device 10. The valve 75 may be positioned directly below the location of the air motor 71 and overlies the arm 78 which extends from the base 12. An eye 79 is provided at the outer end of the arm 78 for attachment to a cable, as will be described hereinafter.

Actuation of the lever 77 opens the air control valve 75 and causes the air motor 21 to rotate the shaft 60. The shaft 50 may be driven from the shaft 60 at a low speed through gears 57 and 59 or at a high speed through gears 56 and 58. The shifter handles 69 are employed to render either the high speed or low speed drive effective. Rotation of the shaft 50 causes the sprocket 38 to drive the chain 35 and hence to turn the ring 16. As the ring 16 rotates the side opening 17 comes under the links of the chain 35 and the chain spans the opening during a part of the revolution of the ring 16.

Means are provided on the ring 16 to grip a pipe 80, and as shown in the drawings this means includes a carrier 83 on which pipe gripping jaws 81 and 82 are mounted. The carrier 83 is positioned co-axially of the ring 16 and rests on an annular shelf 84 provided on the ring 16. The arcuate shoulders 85 and 86 provided on the carrier 83 are received between the upper and lower arcuate rims 87 and 88 respectively which are provided on the ring 16. The arcuate length of the shoulders 85 and 86 is made less than the width of the side opening 17 provided in the ring 16. The carrier 83 may be assembled into the ring by aligning two of the surfaces 85 and 86 with the side opening 17 and then tilting the carrier 83 with respect to the ring.

The carrier 83 is free to turn within the ring 16, being guided by the arcuate walls 89 and 90. The jaw 82 is fixed to the carrier 83 by means of a single attaching pin 92. This fixed jaw 82 may be provided with a pair of circumferentially spaced pipe gripping dies 93 and 94. These dies extend vertically on the fixed jaw 82 and may be removed upon withdrawal of the holding elements 95 which pass through ears 96 formed on the jaw 82. The pin 92 fixed on the carrier 83 provides a pivotal mounting for the inner end of the lever 98. This lever extends outwardly from the carrier 83 into a position between upstanding drive pins 99 and 100 which are circumferentially spaced and fixed on the integral ring 16. A roller 101 is mounted on the pin 100, and a block 102 is rotatably mounted on the pin 99.

The movable jaw 81 is pivotally connected to the lever 98 by means of the pivot pin 104, and this jaw carries a removable pipe gripping die 105. As clearly shown in Figure 8 the movable jaw 81 is provided with a pair of vertically extending lugs 106, and these lugs are adapted to engage the end surfaces 107 provided on the carrier 83. The main portion of the jaw 81 between its point of pivotal connection with the lever 98 and the lugs 106 is positioned between the upper and lower arcuate plates 108 of the carrier 83.

A brake rim 109 extends upwardly from the carrier plate 108 and is adapted to be contacted by a stationary brake band 110 secured to the cover 13 by means of the attaching pins 111. Friction lining 112 may be provided on the band 110. The function of the band 110 and rim 109 is to retard rotation of the carrier 83.

From the above description it will be understood that rotation of the ring 16 from the position shown in Figure 5 to the position shown in Figure 6 causes the movable jaw 81 to move from its fully retracted position to an operative position in which the die 105 contacts the pipe 80. Since the brake band 110 and brake rim 109 cooperate to resist rotary movement of the carrier 83, the clockwise rotation of the ring 16 causes the lever 98 to pivot about the pin 92 and hence cause the lugs 106 on the movable jaw 81 to move inwardly toward the pipe 80 along the surfaces 107 provided on the carrier 83. After the pipe-gripping die 105 engages the pipe 80 further and continued rotation of the ring 16 drags the carrier 83 around with the ring 16 against the relatively light resistance offered by the brake band 110.

The pipe-gripping dies 93, 94 and 105 are spaced circumferentially of the pipe 80 to provide a solid grip for the pipe. The dies may be spaced at 120°, or as shown in the drawings the dies 93 and 94 may be spaced at 90° with the jaw 105 positioned at about 135° from each.

After a pipe joint has been screwed up it is necessary to withdraw the tong device from the pipe. Accordingly, the side opening 17 in the ring 16 must be aligned with the entrance opening 28 in the base 12. The threads of the pipe joint may become tightened to any random position, and accordingly a means must be provided for turning the ring 16 in a reverse direction in order to bring about alignment of the side opening 17 with the entrance opening 28. As shown in the drawings, this means includes the reversing lever 72 on the air motor 71. This means further includes a positioning valve generally designated 113 shown in detail in Figures 15 and 16. This valve includes a stationary housing 114 fastened to the cover 13 by means of screw elements 115 and provided with a central bore 116. A central valve stem 117 is fitted within the bore 116 and is provided with a central groove 118. The lower end of the stem 117 carries a roller 119 which is adapted to roll on the upper surface of the sprocket 33.

When the roller 19 encounters the cam 120 which is mounted on the sprocket 33 it raises the valve stem from the position shown in Figure 16 to the position shown in Figure 17. In this latter position the groove 118 is out of alignment with the side ports 121 and 122 communicating with the pipes 123 and 124 respectively. These pipes are connected to the air supply conduit 74 in a manner to bypass the air control valve 75. Thus the fitting 76 connects the pipe 124 with the air supply conduit 74 upstream from the air control valve 75, while the fitting 126 connects the pipe 123 with the downstream side of the air control valve 75.

From this description it is to be understood that whenever the positioning valve 113 is in the open position as shown in Figure 16, air under pressure is supplied to drive the air motor 71. Accordingly, the carrier 83 and pipe-gripping jaws 81 and 82 may be driven in a counterclockwise direction by actuating the reverse lever 72 and by manually depressing the nob 127 on the upper end of the positioning valve stem 117. This causes the air motor to rotate in a reverse direction and to rotate the sprocket 33 and ring 16 until the roller 119 rides up on the cam 120, shutting off the air supply to the air motor 71. The cam 120 is positioned on the sprocket 33 in the proper angular position to bring the side opening 17 of the ring 16 into alignment with the entrance opening 28 in the base 12 when the air motor 71 stops turning.

As shown in Figures 1, 3, 9 and 11 a guard generally designated 128 may be pivotally mounted on the shaft 22. The upper end of the shaft may be threaded to receive a threaded bushing 129. A boss 130 on the upper portion 131 of the guard 128 is provided with a bore 135 to receive the external cylindrical surface of the bushing 129. The upper and lower portions 131 and 132 of the guard 128 may be secured together by means of a bolt 133 connecting adjoining ears 134. A bore 136 in the lower portion 132 is positioned in alignment with the bore 135 and is adapted to receive a cylindrical projection 137 on the bushing 138 which is threaded to the lower portion of the shaft 22. A pair of vertically spaced ears 139 extends from the upper portion 131 of the guard 128 and is pivotally connected to one end of a spring housing 140 by means of the pivot pin 141. The housing 140 is slotted at one end as shown at 142 to receive a stationary pin 143 in sliding relation. The pin 143 is fixed on a pair of projections 144 provided on the cover 13. A compression spring 145 is mounted in the cylinder 140 and bears against the pivot pin 141 at one end and against the stationary pin 143 at the other end. The position of the pins 141, 143 and the shaft 22 is such that an over-center mounting is provided for the guard 128. Thus the compression spring 145 is adapted to maintain the guard 128 in either the open position as shown in Figure 1 or the closed position as shown in Figures 3 and 4.

The upper portion 131 of the guard 128 comprises a substantially flat sheet adapted to overlie the cover 13. Similarly, the lower portion 132 of the guard includes a sheet adapted to underlie a portion of the base 12. Each of the sheets is cut away to provide a substantially semicircular recess 146 and a finger 147. When the tong device 10 is initially moved toward the pipe 80 the finger 147 contacts the pipe and rotates the guard as the tong device 10 approaches the pipe 80. As the pipe 80 passes into the entrance slot 28 and into the side opening 17 in the ring 16 the guard moves to the closed position, as indicated in Figure 3, and is maintained closed by the action of the spring 145. In its closed position the guard acts as a barrier protecting the operator of the tong from injury by any possible contact with the ring 16 or the teeth of the sprocket 33.

Any suitable or desirable means may be provided for supporting the tong in operative position. As shown in Figures 1 and 2 a pair of brackets 148 may be provided on the cover 13 and base 12, and a connector pin 149 carried on each bracket 148 may be used to connect with such supporting device. A preferred form of supporting device is shown in my co-pending application for roll-over tong support filed of even date herewith.

In operation, the tong device 10 is moved toward the pipe 80 which engages the finger 147 on the guard 128 as it enters the slot 28 provided in the frame 11. The pipe 80 passes through the side opening 17 in the ring 16, and movement of the tong device is arrested by contact of the pipe 80 with the dies carried in the stationary jaw 82. The guard 128, meanwhile, has taken the closed position illustrated in Figure 3. One of the shifter levers 69 is actuated by the operator to engage the high speed drive. The operator then opens the air control valve 76 by manipulation of the valve handle 77. This supplies air pressure to the fluid motor 71 and causes it to turn the shafts 60 and 50, thereby rotating the driving sprocket 38. The chain 35 then rotates the driven sprocket 33 in clockwise direction.

The brake band 110 acts to restrain initial rotation of the carrier 83, and accordingly the lever 98 moves from the position shown in Figure 5 to the position illustrated in Figure 6, thereby moving the jaw 81 from the retracted position to its operative position on the pipe 80. Continued rotation of the sprocket 33 and ring 16 rotates the carrier as a unit with the ring 16 against the relatively light resistance offered by the brake band 110, thereby turning the pipe 80. A back-up line 97 is fastened to the eye 79 as shown in Figure 1, to resist bodily swinging movement of the tong device under the reaction torque of the ring 16.

The screwing motion of the pipe continues until the threads tighten to the point where the air motor 71 stalls under overload. The operator then moves one of the shifter handles 69 to engage the low speed drive. The greater torque available at low speed then continues the rotation of the pipe 80 until the joint is made up. The operator then releases the handle 77 of the air control valve 75, shutting off the supply of air pressure to the air motor 71. The operator then actuates the reversing lever 72 on the air motor 71 and depresses the nob 127 on the stem of the positioning valve 113. The valve 113 and conduits 123 and 124 provide a bypass around the main air control valve 75, and hence air pressure is again applied to the air motor 71.

The sprocket 33 and ring 16 are then driven in a counterclockwise direction, and the effect of the brake band 110 is initially to resist rotation of the carrier 83. Accordingly, the lever 98 is pivoted about the pin 92 from the position shown in Figure 6 to the position shown in Figure 5, thereby retracting the movable jaw 81 and its die 105 away from the pipe 80. Counterclockwise rotation of the lever 98 about the pin 92 and hence counterclockwise rotation of the ring 16 relative to the carrier 83 is limited by engagement of the lever surface 98a with the surface of the jaw 82. When the roller 119 carried on the stem of the positioning valve 113 rides up on the block 120 carried on the sprocket 33, the bypass connection around the main air control valve 75 is interrupted, cutting off the supply of air to the air motor 71. The motor then stops with the position of the side opening 17 in the ring substantially aligned with the location of the entrance slot 28 in the frame 11. The tong device 10 may be moved away from the pipe, the pipe passing outwardly through the aligned opening 17 and slot 28 and moving the pivoted guard 128 back to its open position as shown in Figure 1.

If the roller 119 carried on the stem of the positioning valve 113 should happen to be positioned directly over the block 120 on the sprocket 33 when the pipe joint reaches its fully made up position, the operator would not be able to depress the nob 127 to open the positioning valve 113. In this position the ring opening 17 is aligned with the frame slot 28 but the movable jaw 81 is in pipe-gripping position, and hence the jaw must be released before the pipe can be withdrawn through the opening 17 and slot 28. Accordingly, when the nob 127 cannot be depressed the operator actuates the reversing lever 72 on the air motor 71 and the main air control valve 75 in order to rotate the ring 16 for a part of a revolution in a counterclockwise direction. The nob 127 is then depressed and the valve handle 77 released. The motor 71 is then driven in a reverse direction by air supplied to the bypass via conduits 123 and 124, and the ring 16 comes to rest with the opening 17 substantially aligned with the slot 28, and with the movable jaw 81 in its retracted position. The pipe 80 may then be withdrawn through the aligned slot and opening.

The tong device 10 may be used for different pipe sizes by merely changing the jaws 81 and 82. This is readily accomplished upon removal of the single pivot pin 92. When it is desired to use the tong for unscrewing sections of pipe instead of for screwing them together the entire tong device 10 may be inverted. The roll-over hanger described in my co-pending application above referred to is particularly useful in this regard. Figure 18 shows another method of using the tong device for unscrewing, i. e., for rotating the pipe in a counterclockwise direction. The movable jaw and fixed jaw may be removed from the carrier 83 and reassembled as shown in Figure 18. This is accomplished by withdrawing the pivot pin 92, thereby disconnecting the fixed jaw 82 from the carrier 83. The fixed jaw 82 may be removed from the carrier 83, and the movable jaw 81 together with the pivotally connected lever 98 may also be removed. The jaws are then inverted and reassembled as shown in Figure 18, with the lever 98 positioned between the roller 101 and the rotatable block 150 positioned on the pin 151. The pin 151 is fixed on the ring 16. The carrier 83 is symmetrical about a plane passing through its rotary axis and through the axis of the pin 92. Accordingly, the lugs 106 on the movable jaw 81 ride against the surfaces 107a on the carrier 83. Counterclockwise rotation of the ring 16 first engages the movable jaw with the pipe, and continued rotation causes the carrier 83 to revolve with the ring 16 against the frictional resistance offered by the brake band.

Having fully described my invention, it is to be understood that I do not wish to be limited to the details herein set forth, but my invention is of the full scope of the appended claims.

I claim:

1. In a power tong, the combination of: a frame; an integral ring rotatably supported on the frame and adapted to encompass a pipe, the ring having a side opening through which the pipe may pass; a carrier journaled within the ring and adapted for limited axial turning movement relative to the ring; a first pipe-gripping element fixed relative to the carrier and provided with a pair of circumferentially spaced pipe contacting dies; a second pipe-gripping element mounted for movement relative to the carrier between an operative pipe-gripping position and an inoperative retracted position; a pipe contacting die on the second element; means including a member adjacent one of the first said dies and operatively interposed between the ring and the carrier and adapted to shift the second element from one position to the other upon relative turning movement of the ring and carrier; power means to rotate the ring; and brake means adapted to retard rotation of the carrier.

2. In a power tong, the combination of: a frame; an integral ring rotatably supported on the frame and adapted to encompass a pipe, a carrier journalled within the ring and adapted for limited axial turning movement relative to the ring; a radially immovable pipe-gripping element fixed relative to the carrier, the ring and carrier each having a side opening through which the pipe may pass; a radially movable pipe-gripping element mounted for movement relative to the carrier between an operative pipe-gripping position and an inoperative retracted position; means including a member positioned radially opposite the opening in the carrier and operatively interposed between the ring and the carrier and adapted to shift the radially movable element from one position to the other upon relative turning movement of the ring and carrier; power means to rotate the ring; and brake means carried by the frame adapted to retard rotation of the carrier.

3. In a power tong, the combination of: a frame; an integral ring rotatably supported on the frame and adapted to encompass a pipe, the ring having a side opening through which the pipe may pass; a carrier mounted on the ring and adapted for limited axial turning movement relative to the ring; a radially immovable pipe-gripping element fixed relative to the carrier; a radially movable pipe-gripping element mounted for movement relative to the carrier between an operative pipe-gripping position and an inoperative retracted position; a lever positioned adjacent the radially immovable element and operatively connected to both the ring and the carrier; pivot means connecting the lever and the radially movable element whereby the lever may shift the radially movable element from one position to the other upon relative turning movement of the ring and carrier; and power means to rotate the ring.

4. In a power tong, the combination of: a frame; an integral ring rotatably supported on the frame and adapted to encompass a pipe, the ring having a side opening through which the pipe may pass to a central position within the ring; a carrier positioned within the ring and adapted for limited axial turning movement relative to the ring; a first pipe-gripping jaw fixed on the carrier; a second pipe-gripping jaw movably mounted on the carrier for movement between an operative pipe-gripping position and an inoperative retracted position away from the pipe, the second jaw and carrier having cooperating surfaces for guiding the second jaw between said positions; a lever operatively connected to both the ring and the carrier; pivot means connecting the lever and the second jaw whereby the lever may shift the second jaw from one position to the other upon relative turning movement of the ring and carrier; and power means to rotate the ring.

5. In a power tong, the combination of: a rotatable jaw carrier; a first pipe-gripping jaw fixed on the carrier; a second pipe-gripping jaw mounted on the carrier for movement toward and away from a central pipe, the second jaw and carrier having cooperating surfaces for guiding movement of the second jaw; a lever pivotally mounted on the carrier; pivot means connecting the lever and the second jaw whereby the lever may shift the position of the second jaw; and means for moving the lever relative to the carrier.

6. In a power tong, the combination of: a rotatable jaw carrier; a first pipe-gripping jaw fixed on the carrier; a second pipe-gripping jaw mounted on the carrier for movement toward and away from a central pipe, the second jaw and carrier having cooperating surfaces for guiding movement of the second jaw; a lever pivotally mounted on the carrier; pivot means connecting the lever and the second jaw whereby the lever may shift the position of the second jaw; brake means for retarding rotation of the carrier; and means for moving the lever relative to the carrier.

7. In a power tong, the combination of: a frame; an integral ring rotatably supported on the frame and adapted to encompass a pipe, the ring having a side opening through which the pipe may pass to a central position within the ring; a carrier positioned within the ring and adapted for limited axial turning movement relative to the ring; a first pipe-gripping jaw fixed on the carrier; a second pipe-gripping jaw movably mounted on the carrier for movement between an operative pipe-gripping position and an inoperative retracted position away from the pipe, the second jaw and carrier having cooperating surfaces for guiding the second jaw between said positions; a pair of circumferentially spaced drive elements on the ring; a lever pivotally mounted on the carrier and extending between said elements; means connecting the lever and the second jaw whereby the lever may shift the second jaw from one position to the other; and power means to rotate the ring.

8. In a power tong, the combination of: a frame provided with a pipe entrance slot; an integral ring rotatably supported on the frame and having a side opening adapted for alignment with said entrance slot; releasable gripping means carried on the ring adapted to engage a pipe; means including a prime mover mounted on the tong adapted to rotate the ring in either direction; conduit means supplying motive fluid for the prime mover including a pair of flow controlling valves connected in parallel; and cooperating part carried on the ring and frame and connected to said valves adapted to close one of the valves when the side opening and entrance slot are in substantial alignment.

9. In a power tong, the combination of: a frame provided with a pipe entrance slot; an integral ring rotatably supported on the frame and having a side opening adapted for alignment with said entrance slot; releasable gripping means carried on the ring adapted to engage a pipe; means including a fluid driven motor mounted on the tong and adapted to rotate the ring in either direction; means supplying fluid pressure to operate said motor, said means including a valve; and an actuator carried on the ring and connected to said valve adapted to close the valve to stop the fluid motor when the side opening and entrance slot are in substantial alignment.

10. In a power tong, the combination of: a frame provided with a pipe entrance slot; an integral ring rotatably supported on the frame and having a side opening adapted for alignment with said entrance slot; releasable gripping means carried on the ring adapted to engage a pipe; means including a fluid driven motor mounted on the tong and adapted to rotate the ring in either direction; means including a main control valve for admitting pressure fluid to operate said motor; a bypass conduit extending around said main control valve; a positioning valve in said bypass conduit; and means carried on the ring adapted to close the positioning valve to stop the fluid motor when the side opening and entrance slot are in substantial alignment.

11. In a power tong, the combination of: a frame provided with a pipe entry slot; an integral ring rotatably supported on the frame and having a side opening adapted for alignment with said entrance slot; releasable gripping means carried on the ring adapted to engage a pipe; an air motor supported on the tong; power transmission connections whereby the air motor may rotate the ring; means including a main control valve for admitting air pressure to operate said air motor; a bypass conduit extending around said main control valve; a selectively operable positioning valve in said bypass conduit and mounted on said frame; and an actuator carried on the ring and adapted to close the positioning valve to stop the air motor when the side opening and entrance slot are in substantial alignment.

12. In a power tong, the combination of: a rotatable jaw carrier; first and second pipe-gripping jaws mounted on the carrier; a pin adapted to secure the first jaw to the carrier, the carrier being symmetrical with respect to a plane passing through the axis of the pin and the rotary axis of the carrier; a lever pivotally mounted on the pin, the second jaw being pivotally attached to the lever and being guided for movement on the carrier toward and away from a central pipe; power means for moving the lever relative to the carrier, whereby the jaws cooperate to turn the pipe in one direction, the jaws upon withdrawal of said pin being adapted for assembly on the carrier in interchanged position whereby they may cooperate to turn the pipe in the other direction.

13. In a power tong, the combination of: a frame; an integral ring rotatably supported on the frame and adapted to encompass a pipe, the ring having a side opening through which the pipe may pass to a central position within the ring; a jaw carrier positioned within the ring and adapted for limited axial turning movement relative to the ring; a pipe gripping jaw assembly adapted to be mounted on the carrier in a first position to rotate the pipe in one direction or in a second position to rotate the pipe in the other direction; a single pivot pin adapted to secure the assembly to the carrier in either position; a lever pivotally mounted on said pivot pin and adapted to cause the jaw assembly to grip the pipe; and means on the ring adapted to actuate the lever.

14. In a power tong, the combination of: a frame; an integral ring rotatably supported on the frame and adapted to encompass a pipe, the ring having a side opening through which the pipe may pass to a central position within the ring; a jaw carrier positioned within the ring and adapted for limited axial turning movement relative to the ring; a pipe gripping jaw assembly adapted to be mounted on the carrier in a first position to rotate the pipe in one direction or in a second position to rotate the pipe in the other direction, said assembly including a fixed jaw and a movable jaw; a pivot pin adapted to secure the fixed jaw to the carrier in either position of the assembly; a lever pivotally mounted on the pivot pin; pivotal means connecting the lever and the movable jaw; and means on the ring adapted to actuate the lever.

15. In a power tong, the combination of: a frame; an integral ring rotatably supported on the frame and adapted to encompass a pipe, the ring having a side opening through which the pipe may pass to a central position within the ring; a jaw carrier positioned within the ring and adapted for axial turning movement relative to the ring; releasable pipe gripping jaws mounted on the carrier; means responsive to relative turning movement of the ring and carrier adapted to cause the jaws to grip the pipe; a driven sprocket fixed on the ring and adapted to rotate the ring; a brake rim on the carrier positioned radially within said sprocket and enclosed by the frame; and a brake band assembly fixed to the frame and engaging the rim to retard rotation of the carrier.

16. In a power tong, the combination of: a frame; an integral ring adapted to encompass a pipe and having a side opening through which the pipe may pass to a central position within the ring; releasable means mounted on the ring for gripping the pipe; means including a plurality of rollers for rotatably supporting the ring on the frame, at least one of said rollers being rotatably mounted on a shaft carried on the frame and extending parallel to the rotary axis of the ring, the shaft having an eccentric portion; an idler sprocket rotatably mounted on said eccentric portion; a driven sprocket fixed on the ring; power means including a chain trained over said sprockets adapted to drive the ring; and means whereby the shaft may be angularly oriented relative to the frame to shift the position of the idler sprocket without shifting the position of the roller.

17. In a power tong, the combination of: a frame; an integral ring rotatably supported on the frame; a carrier journaled on the ring co-axially thereof, the ring and carrier each having a side opening through which the pipe may pass to a co-axial position; a radially immovable pipe-gripping element fixed relative to the carrier; a radially movable pipe-gripping element mounted for movement relative to the carrier between an operative pipe-gripping position and an inoperative retracted position; a lever; a pivot pin on the carrier opposite the carrier opening connecting the lever to the carrier; a second pivot pin connecting the movable pipe-gripping element to the lever; and drive means on the integral ring engaging the lever.

18. In a power tong, the combination of: a frame; an integral ring rotatably supported on the frame; a carrier journaled on the ring co-axially thereof, the ring and carrier each having a side opening through which the pipe may pass to a co-axial position, the carrier opening being wider than the ring opening; a radially immovable pipe-gripping element fixed relative to the carrier; a radially movable pipe-gripping element mounted for movement relative to the carrier between an operative pipe-gripping position and an inoperative retracted position; a lever; a pivot pin on the carrier opposite the carrier opening connecting the lever to the carrier; a second pivot pin connecting the movable pipe-gripping element to the lever; and drive means on the integral ring engaging the lever.

CHESTER A. LUNDEEN.

REFERENCES CITED

The following references are of record in the file of this patent:

UNITED STATES PATENTS

| Number | Name | Date |
| --- | --- | --- |
| 1,300,995 | Moody | Apr. 15, 1919 |
| 1,417,490 | Brandon | May 30, 1922 |
| 1,478,020 | Butler | Dec. 18, 1923 |
| 1,505,007 | Cox et al. | Aug. 12, 1924 |
| 1,660,853 | Wilson | Feb. 28, 1928 |
| 1,955,727 | Adams | Apr. 24, 1934 |
| 2,000,221 | Dawson | May 7, 1935 |
| 2,305,624 | Lange et al. | Dec. 22, 1942 |
| 2,317,306 | Smith | Apr. 20, 1943 |
| 2,405,757 | Rowland | Aug. 13, 1946 |